(12) United States Patent
Blawat et al.

(10) Patent No.: US 8,958,130 B2
(45) Date of Patent: Feb. 17, 2015

(54) METHOD AND APPARATUS FOR ARCHIVING AN IMAGE

(71) Applicant: Thomson Licensing, Issy de Moulineaux (FR)

(72) Inventors: Meinolf Blawat, Hannover (DE); Peter Jax, Hannover (DE); Klaus Gaedke, Hannover (DE); Ingo Huetter, Hannover (DE)

(73) Assignee: Thomson Licensing, Issy les Moulineaux (FR)

( * ) Notice: Subject to any disclaimer, the term of this patent is extended or adjusted under 35 U.S.C. 154(b) by 9 days.

(21) Appl. No.: 13/715,755

(22) Filed: Dec. 14, 2012

(65) Prior Publication Data

US 2013/0155470 A1    Jun. 20, 2013

(30) Foreign Application Priority Data

Dec. 16, 2011   (EP) ..................... 11306689

(51) Int. Cl.
| | |
|---|---|
| *H04N 1/00* | (2006.01) |
| *G06K 15/12* | (2006.01) |
| *G06K 19/06* | (2006.01) |
| *G06K 15/02* | (2006.01) |
| *G11B 27/00* | (2006.01) |
| *H04N 1/32* | (2006.01) |

(52) U.S. Cl.
CPC .............. *G06K 15/021* (2013.01); *G11B 27/00* (2013.01); *H04N 1/32133* (2013.01); *H04N 2201/3269* (2013.01); *H04N 2201/3271* (2013.01)
USPC ......................................... 358/3.28; 235/494

(58) Field of Classification Search
None
See application file for complete search history.

(56) References Cited

U.S. PATENT DOCUMENTS

| | | | |
|---|---|---|---|
| 3,961,315 A | 6/1976 | Yokoyama | |
| 5,842,063 A * | 11/1998 | Hawkins et al. | ............... 396/315 |
| 7,003,166 B2 * | 2/2006 | Abhyankar et al. | ........... 382/237 |
| 7,212,322 B2 * | 5/2007 | Abhyankar | .................... 358/527 |
| 7,269,271 B2 * | 9/2007 | Harrington | .................... 358/3.28 |
| 7,302,118 B2 * | 11/2007 | Liu et al. | ........................ 382/306 |
| 7,489,818 B2 | 2/2009 | Quick et al. | |
| 7,597,262 B2 | 10/2009 | Wang et al. | |
| 2003/0095802 A1 * | 5/2003 | Mimaki et al. | .................. 396/564 |
| 2007/0092842 A1 * | 4/2007 | Prigent | .......................... 430/321 |

FOREIGN PATENT DOCUMENTS

| | | | |
|---|---|---|---|
| GB | 2428130 A | * | 1/2007 |
| JP | 54146518 | | 11/1979 |
| JP | 2009217137 | | 9/2009 |

OTHER PUBLICATIONS

Steffen W. Schilke et al.: "Long-term archiving of digital data on microfilm", Int. J. Electronic Governance, vol. 3, No. 3, 2010, Jan. 1, 2010, pp. 237-253.

(Continued)

*Primary Examiner* — Scott A Rogers
(74) *Attorney, Agent, or Firm* — International IP Law Group, PLLC

(57) ABSTRACT

A method and an apparatus for archiving an image on a photographic medium are described. The image consists of an array of pixels, where a color depth of the pixels is n bits. In addition to recording the array of pixels on the photographic medium also a subset of the n bits describing the color of the pixel is recorded on the photographic medium for each pixel.

20 Claims, 7 Drawing Sheets

(56) References Cited

OTHER PUBLICATIONS

Daniel Fluck: "Ausbelichtung digitaler Daten auf Farbmikrofilm: Neue Moeglichkeiten und Kostenperspektiven fuer die Langzeitarchivierung", Oct. 26, 2007, pp. 1-30.

Christoph Voges et al.: "Technology and Applications of Digital Data Storage on Microfilm", Journal of Imaging Science and Technology, Society of Imaging Science & Technology, Nov.-Dec. 2009, pp. 060505-1 to 060505-8.

European Search Report dated Feb. 2, 2012.

Mohr, "Paperback v1.10", Internet article: http://ollydbg.de/Paperbak/, Publication Date: Jul. 1, 2007.

Mueller et al.: "PEVIAR-Digital Originals", ACM Journal on computing and Cultural Heritage, vol. 3, No. 1, Article 2, Jun. 2010.

* cited by examiner

METHOD AND APPARATUS FOR ARCHIVING AN IMAGE

This application claims the benefit, under 35 U.S.C. §119 of EP Patent Application 11306689.8, filed 16 Dec. 2011.

FIELD OF THE INVENTION

The invention relates to a method and an apparatus for archiving an image, and more specifically to a method and an apparatus for archiving an image consisting of pixels on microfiches or films.

BACKGROUND OF THE INVENTION

It is commonly recognized that polyester based modern microfiches as well as films may carry information printed on their optical reactive emulsions for very long periods. Therefore, one possible solution for long-term archival of data, e.g. of movies, photographs, scans of cultural heritage, etc., is to print the analog data directly onto such microfiches or films.

An important benefit of storing such photographs or scans in an analogous manner is that the archived objects are directly visible, i.e. perceptible, to the naked eye. Therefore, if the archived analog data need to be recovered sometime in the future, the archivists can directly see what has been printed. Hence, no dedicated scanning devices and decoding or deciphering schemas need to be applied. This is advantageous as the knowledge about the necessary scanning devices or the schemas might be lost in the course of time.

In this regard US 2007/0092842 discloses a method of recording data on a photographic support. Digital encoding marks are formed on the support, which are linked to data items recorded on the support. The digital encoding marks contain metadata associated to the data items. One particular application is the recording of data relating to images captured on a film. The data are metadata related to the images. They give the conditions and circumstances in which the images were captured or treated as well as a description of the characteristics of the deployed film. These metadata can be helpful for a future processing of the recorded images.

Though the quality of the photographs or scans to be archived is important for the quality of the data that can later be retrieved from the microfiches or films, the rescanning process is mainly responsible for major deviations between the originals and the corresponding facsimiles. Very often the brightness resolution of the scanned data does not match the original brightness of the photographs or scans.

SUMMARY OF THE INVENTION

It is thus an object of the present invention to propose a solution for archiving an image consisting of an array of pixels that allows for achievement of an improved quality upon retrieval of the archived image.

According to the invention, a method for archiving an image on a photographic medium, the image consisting of an array of pixels, where a color depth of the pixels is n bits, n being an integer, comprises the steps of:
- recording the array of pixels of the image on the photographic medium; and
- additionally recording for each pixel of the array of pixels a subset of the n bits describing the color of the pixel on the photographic medium.

Similarly, an apparatus for archiving an image on a photographic medium, the image consisting of an array of pixels, where a color depth of the pixels is n bits, n being an integer, comprises:
- a processor for determining for each pixel of the array of pixels a subset of the n bits describing the color of the pixel; and
- a recorder for recording the array of pixels of the image and for each pixel the determined subset of the n bits on the photographic medium.

The invention proposes to record images on a photographic medium, e.g. on a film, a microfilm, or a microfiche, as an array of pixels with a given color depth of n bits. The images preferably are digital photographs or scans of analog photographs, but it is likewise possible to store any type of data encoded as pixel patterns. An important benefit of storing images in an analog manner is that the archived objects are being directly perceptible with the naked eye. In order to improve the quality of rescanned archived images, for each pixel of the images a subset of the n bits describing the respective pixel is recorded on the photographic medium in addition to the array of pixels of the images. The images and the corresponding additional data are either recorded in neighboring areas of the photographic medium, on separate areas of the photographic medium, or even on separate photographic media. The additional data is later used during the rescan operation to reduce of even fully correct potential errors in the rescanned images, e.g. due to degradation of the photographic medium or caused insufficiencies of the rescanning process. Recording is preferably performed by printing, which is a common technology. This allows for easy integration of the solution according to the invention into known archiving solutions.

Advantageously, the subset of the n bits includes bits that are most affected by a degradation of the photographic medium or by insufficiencies of a process for retrieving the image from the photographic medium. Especially the brightness resolution of the scanned pixels does often not match the original brightness of the printed pixels. When scanning a printed photograph mostly the finer details of the brightness of each pixel are lost. However, these scanning errors can be quite precisely estimated. Similarly, over time the archived images will deteriorate due to aging processes of the film material. Generally, the images are slightly fading, i.e. the brightest image parts are getting darker. Again, these aging processes can be reliably estimated. An estimation of both effects thus allows for determination of which subsets of the n bits describing the pixels need to be recorded. Generally, the most affected bits are the least significant bits.

Preferably, the subset of the n bits is recorded as a checkered pattern of binary values or grey values. Such a pattern can be easily retrieved, e.g. with a scanner, and reliably decoded. Favorably, the checkered pattern comprises error correction data. In this way potential errors stemming from the retrieval process can be corrected.

Advantageously, the checkered pattern is divided into two or more blocks associated to sets of adjacent pixels of the image. These blocks are processed independently, which increases the overall processing speed. In addition, by distributing the blocks over a larger area of the photographic medium, the risk of a destruction of a complete set of additional data for an image is reduced. The two or more blocks are preferably provided with position information of the associated sets of adjacent pixels of the image. This allows for proper assignment of each additional data element to the correct pixel of the corresponding image.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

It is commonly recognized that polyester based modern microfiches as well as films may carry information printed on their optical reactive emulsions for very long periods. Some reports indicate an archival time of hundred or even several hundred years. Therefore, one possible solution for long-term archival of data, e.g. of movies, photographs, scans of cultural heritage, etc., is to print the analog data directly onto such microfiches or films, i.e. to archive visible copies of the photographs or scans.

Figure 1:
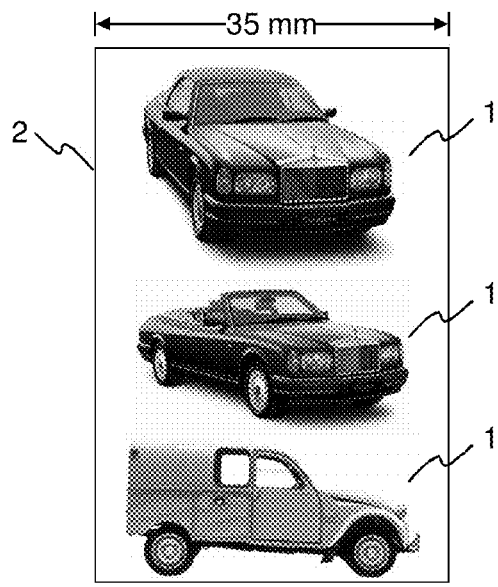
FIG. 1 shows exemplary black and white prints on a 35 mm microfilm.

When printing a photograph modern laser-based film printers first scan the photograph line-by-line, digitize the sampled color values of the single pixels and then write the pixels line-by-line to the film with an adapted intensity of the laser beam. In cases of printing a scan the color values of the scanned pixels are already available. In the following, without any restrictions of generality, the considerations will be referred to black and white pictures only. Exemplary black and white prints of images 1 on a 35 mm microfilm 2 are shown in FIG. 1.

Figure 2:
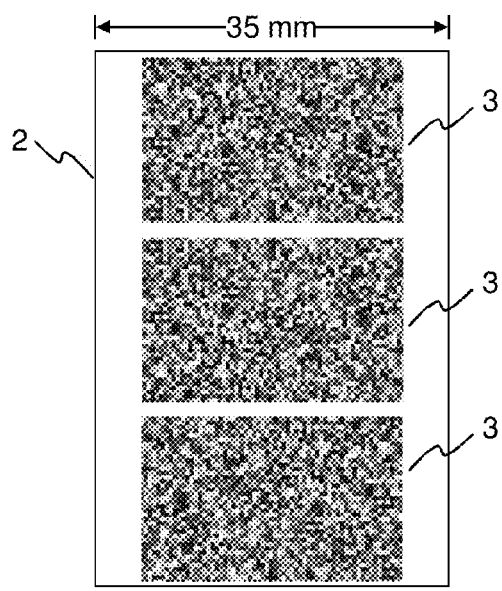
FIG. 2 illustrates data stored as checkered patterns of pixels with different grey values.

The above described technology can not only be used to archive copies of photographs, or in other words analog data, but also digital data. Of course, the digital data need to be appropriately coded, e.g. as discussed in D. Fluck: "Ausbelichtung digitaler Daten auf Farbmikrofilm: Neue Möglichkeiten and Kostenperspektiven für die Langzeitarchivierung", presentation at the Recom Symposion Stuttgart 2007 ("Print of digital data to color microfilm: New opportunities and cost prospects for long-term archival of digital archiving data on color microfilm"; available at http://www.recom-art.de). Digital data can be stored as small black and white squares that are printed line-by-line. For instance, a logical "1" may be represented by a black square, whereas a white square represents a logical "0". Using this scheme the printed digital data are stored as irregular checkered patterns 3. Of course, it is likewise possible to make use of squares with different grey values to store digital data, as it is exemplarily depicted in FIG. 2. A further possibility to encode the digital data is colored squares.

If only black and white squares are printed, then just 1 bit of information is stored per square. If, however, several grey values or colors are used, then the number of bits per square depends on the logarithm of the base 2 of the differentiable color values of the squares. For example, if 8 different grey values can be differentiated then each square represents $\log_2(8)=3$ bits. In the following only black and white squares are considered without loss of generality.

One important purpose of archiving data is to have a fall back copy available in case the original sources are lost. In such situations the archived pictures 1 will be used to produce facsimiles of the originals. In general, the reproduced facsimile should be as close to the original as possible, i.e. no or hardly any differences should be noticeable for the human eye. Unfortunately, this quality criterion will generally not be completely fulfilled.

Similar to the above described recovery of copies of the original photographs or scans, the archived checkered patterns 3 need to be decoded in order to retrieve the original digital data. However, since archival and recovery of analog photographs and scans is in many aspects different from archival and retrieval of digital data, for the sake of clarity both technologies will be considered separately in the following.

With regard to archival of photographs and scans in an analog manner, the main benefit is that the archived objects are directly visible, i.e. perceptible, to the naked eye. Therefore, if the archived images 1 have to be recovered sometimes in the future, the archivists can directly see what has been printed on the films. As a result no dedicated scanning devices and decoding or deciphering schemas have to be applied, about which the knowledge might already be lost. In other words, the issue of technology obsolescence is avoided, at least for a first inspection of the stored photographs or scans 1.

Figure 3:
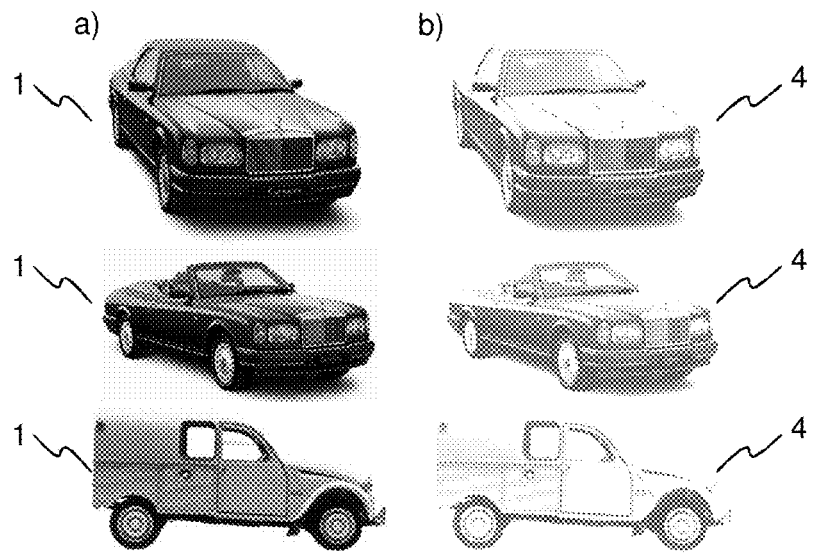
FIG. 3 illustrates original prints and the corresponding deteriorated facsimiles showing a loss in brightness, FIG. 4 schematically illustrates binary representations of two grey values.

However, apart from the quality of the photographs or scans to be archived the rescanning process is mainly responsible for the major deviations between the originals and the corresponding facsimiles. Especially the brightness resolution of the scanned pixels does often not match the original brightness of the printed pixels. As an example, FIG. 3 illustrates—in an exaggerated manner—a loss in brightness between some original prints 1 (FIG. 3a)) and the corresponding deteriorated facsimiles 4 (FIG. 3b)).

Figure 4:
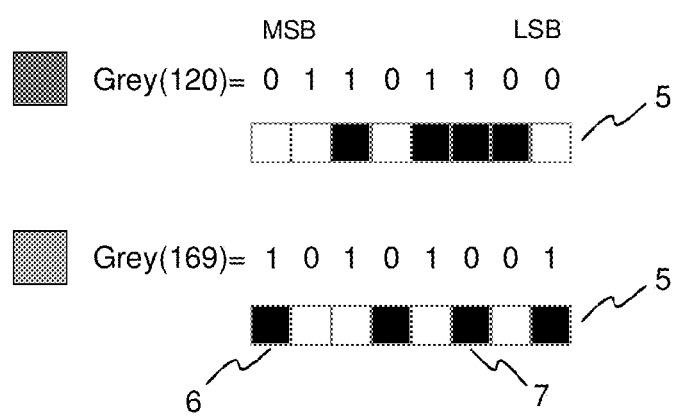

With regard to archival of digital data, in the easiest case binary numbers are coded as series of tiny black and white squares, where each square corresponds to one binary digit. Consequently, if for instance the binary numbers are represented by eight bit, then a series 5 of eight squares 6, 7 needs to be printed for each number. This is schematically illustrated in FIG. 4. In this figure, white squares 6 represent a logical '0', whereas black squares 7 represent a logical '1'. As usual, the digits representing the larger summands of the binary numbers, the most significant bits (MSBs), are positioned left to the smaller summands, the least significant bits (LSBs).

Figure 5:
FIG. 5 shows a checkered pattern representing data.

When the black and white squares 6, 7 are printed line-by-line, and each new line just below the previous one, a checkered pattern 8 representing the digital data is generated, as it is shown in FIG. 5. Depending on the data density, i.e. the number of black and white squares 6, 7 per given area, scanning of the checkered patterns 8 in order to retrieve the stored data will occasionally lead to errors. In other words, the retrieved data deviates from the original stored data. Up to a certain degree these scanning errors can be corrected if an appropriate error correction code (ECC) has been applied when archiving the original data. The downside of applying error correction codes is that additional redundant data have to be stored in addition to the data to be archived.

In order to avoid the aforementioned deviations between the archived photographs or scans 1 and their corresponding facsimiles additional data is stored together with the archived photographs or scans 1. When scanning a printed photograph mostly the finer details of the brightness of each pixel are lost, which then represent the scanning errors. However, these scanning errors can be quite precisely estimated. Therefore, the finer details of the brightness amplitude of the pixels are digitized and stored on the microfiche or microfilm 2 as well. When scanning the stored photographs or scans 1 in order to reconstruct copies as close as possible to the corresponding originals, the additional digital data are also retrieved. The coded information of the fine brightness values is then used to reconstruct the brightness values of the original pixels.

If, for example, the photographs or scans to be archived have a grey scale of 256 levels, which are represented by 8-bit binary numbers, and assuming that common scanners are able to resolve the five most significant bits flawlessly, but produce errors regarding the remaining three least significant bits, then these three least significant bits are added as digital data to the archived photographs or scans 1. The added digital data are preferably protected by a dedicated error correction code so that the data can be flawlessly reconstructed.

Figure 6:
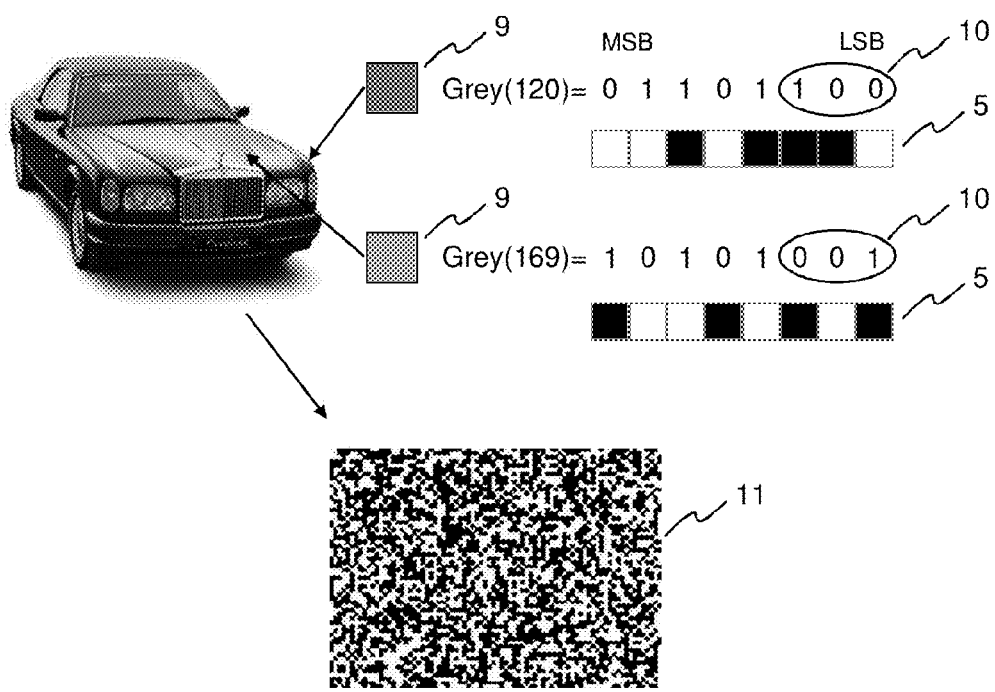
FIG. 6 illustrates storage of the three least significant bits of each pixel as a series of black and white pixels in addition to the original photograph.
Figure 7:
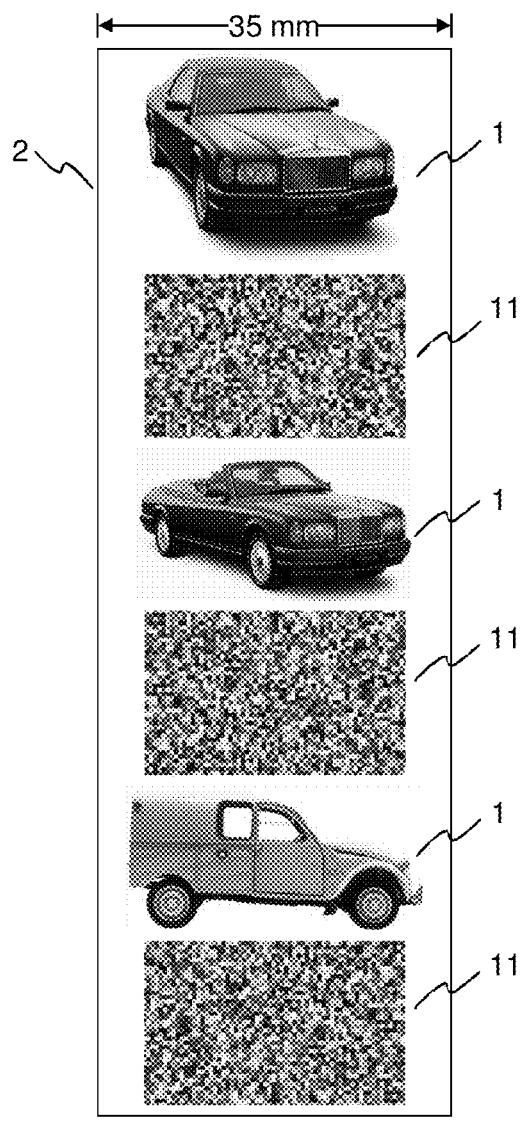
FIG. 7 shows archived photographs on a film with their associated digital data, FIG. 8 schematically illustrates a method according to the invention for archiving an image.

FIG. 6 shows how in addition to the original photograph 1 the three least significant bits 10 of each pixel 9 are consecutively printed to the film as a series of black and white pixels. This results in a checkered pattern 11 of added digital data associated to the photograph, which is stored together with the photograph on the film 2, as illustrated in FIG. 7. In this example each photograph 1 is immediately followed by the corresponding digital data 11, which in this case makes use of grey scale values. Of course, it is likewise possible to arrange the photographs 1 and the digital data 11 on different sections of the film 2 or even on different films 2.

Figure 8:
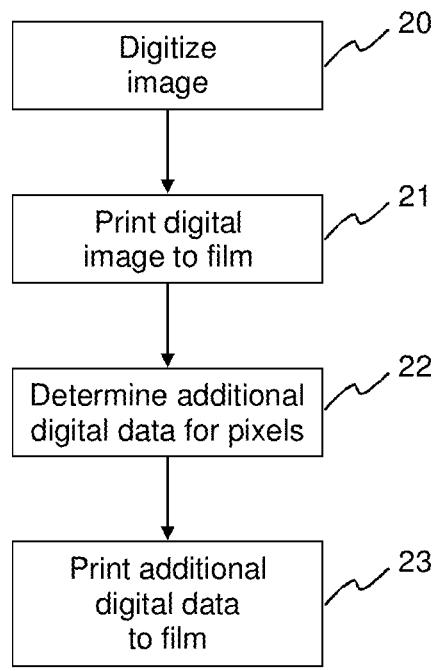

A method according to the invention for archiving an image 1 on a photographic medium 2 is schematically illustrated in FIG. 8. In a first step the image to be archived is digitized 20, if it is not yet available as a digital image 1. The image 1 is then printed 21 to the photographic medium 2. Additional data 11 is determined 22 for the image 1, which is then also printed 23 to the photographic medium 2. Of course, the additional data 11 may likewise be determined 22 before printing 21 the image 1. The additional data 11 include for each pixel 9 a subset 10 of the n bits describing the pixel 9 as well as helper data, if appropriate. The helper data will be described below with reference to FIGS. 10 and 11.

Figure 9:
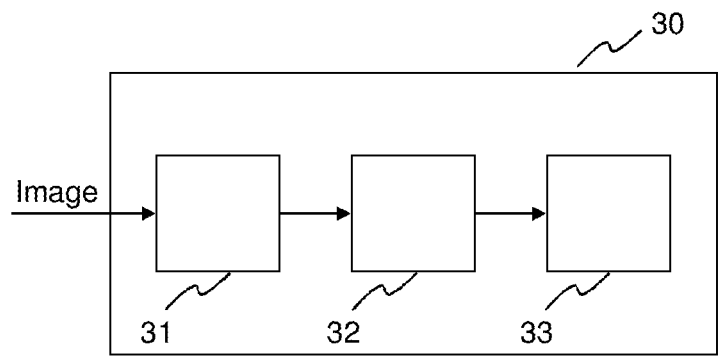
FIG. 9 shows an apparatus implementing the method of FIG. 7.

An apparatus 30 implementing the method of FIG. 8 is depicted in FIG. 9. The apparatus 30 comprises a digitizer 31 for digitizing 20 an image to be archived, if necessary. The apparatus 30 further comprises a processor 32 for determining 22 additional data 11, i.e. for each pixel 9 a subset of the n bits describing the pixel 9 as well as helper data, if appropriate. A recorder 33, e.g. a film printer, allows for recording 21, 23 of the image 1 and the additional data 11 on the photographic medium 2.

Figure 10:
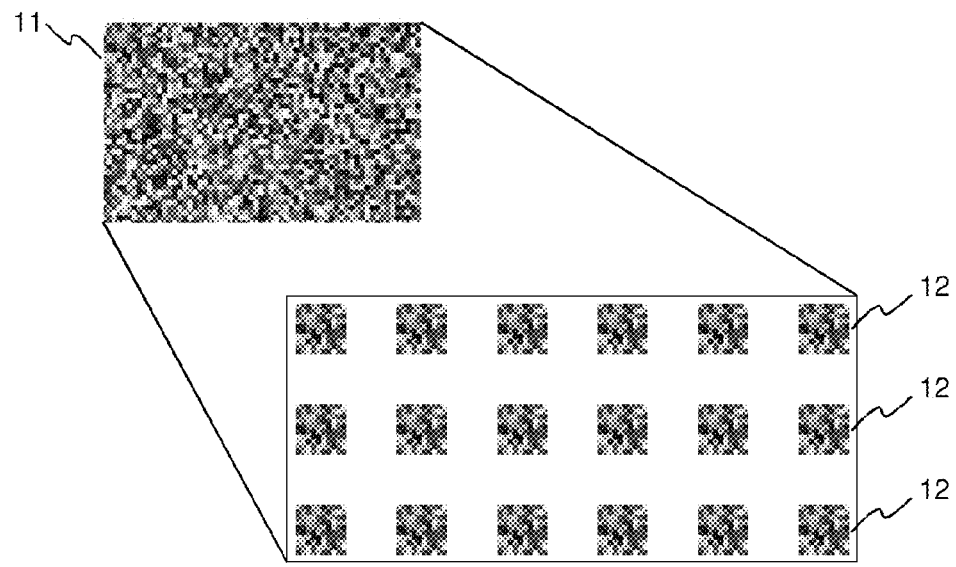
FIG. 10 depicts the division of the digital data into smaller data blocks.
Figure 11:
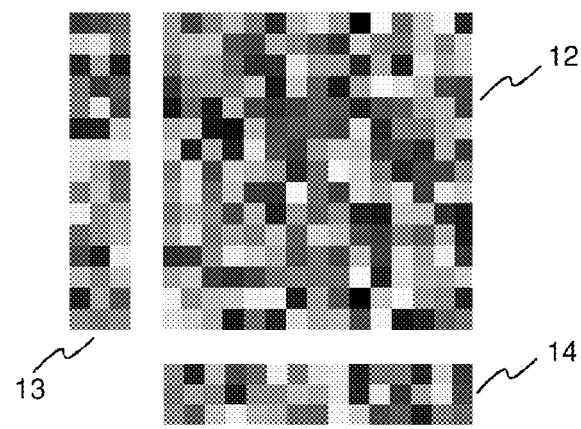
FIG. 11 illustrates the addition of horizontal and vertical helper data to each data block.

Since the printing of digitized photographs and scans 1 is a common technology, the involved technological aspects will not be further detailed here. Preferably, the additional digital data 11 are divided into blocks 12 of data, where each of these blocks 12 belongs to a set of adjacent pixels. FIG. 10 exemplarily illustrates how a set of additional data 11, which in this example uses grey values, is split up into blocks 12. These blocks 12 are processed independently. Additional status information as well as data produced by the applied error correction code is favorably added to each block 12 of data, typically as horizontal helper data 13 (HHD) and vertical helper data 14 (VHD). This is schematically illustrated in FIG. 11. The horizontal helper data 13 and the vertical helper data 14 contain a horizontal and vertical scan synchronization, horizontal and vertical indices of the corresponding start pixel, horizontal and vertical error correction data, etc. The horizontal and vertical indices of the corresponding start pixel indicate where each block 12 is located in the complete set of the additional data 11, which allows proper assignment of each additional data element to the correct pixel 9. As to the error correction data, in the general case the error correction code can be applied to each data subset of each block 12 of additional data 11. For instance, the error correction code can be applied to smaller overlapping blocks 12 and then assigned to the horizontal helper data 13 or the vertical helper data 14, as it is most appropriate. Nevertheless, it is state of the art to process each single line separately and then to assign the generated error correction data to the horizontal helper data 13. Likewise, if each column of the blocks 12 is processed separately the generated error correction data is assigned to the vertical helper data 14. Nevertheless, the order whether first the lines and then the columns are being processed or vice versa is rather arbitrary. Furthermore, depending on the demanded degree of error correction, the application of the error correction code may be restricted to only the data lines or to only the columns of each block 12. In the case of film material as storage media, errors will most likely affect adjacent pixels 9. Such so called burst errors are most effectively covered by dedicated Viterbi algorithms.

Figure 12:
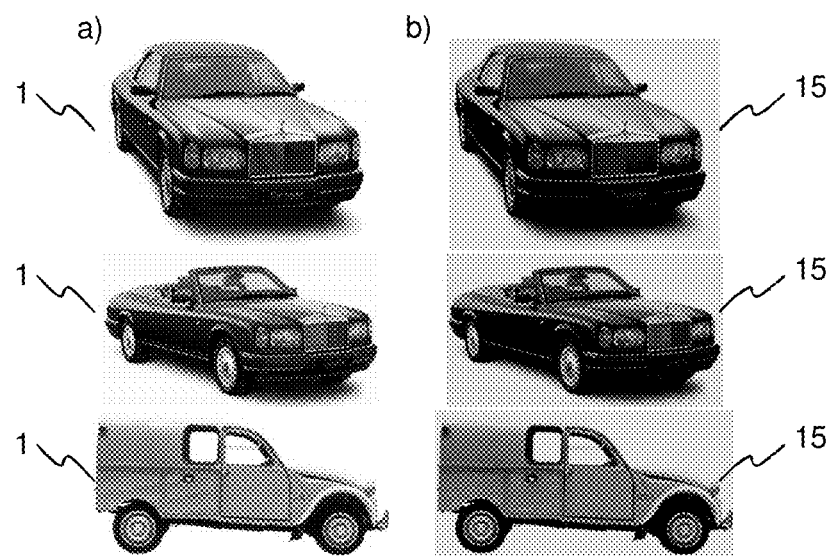
FIG. 12 illustrates original prints and the corresponding deteriorated facsimiles showing a fading effect.

Over time the microfiche or microfilm copies will deteriorate. Even if the deviations are quite small they ate noticeable by an observer. At a certain point in time the differences will be so eminent that the copies will become more or less useless. However, if microfiches and microfilms are properly warehoused they can last for decades or even several hundreds of years. In any case, due to aging processes of the film material, over the years the printed photographs or scans 1 are slightly fading, i.e. the brightest image parts are getting darker. This is schematically illustrated in FIG. 12, which shows—in an exaggerated manner—a fading effect between some original prints 1 (FIG. 12a)) and the corresponding deteriorated facsimiles 15 (FIG. 12b)). These aging processes can be reliably estimated, since essentially some of the least significant bits are affected. Technologically, these fading processes are comparable to the above explained scanning errors. Therefore, the same measures allow for reconstruction of the fading processes of printed microfiches or films. Depending on the order of magnitude of the fading effects, more or less additional digital data needs to be added to the archived photographs or scans. The additional digital data then allow to correct rescanning errors as well as to correct fading processes when producing facsimiles of the archived photographs and scans 1.

What is claimed, is:

1. A method for archiving an image on a photographic medium, the image consisting of an array of pixels, where a color depth of the pixels is n bits, n being an integer, the method comprising:

recording the array of pixels of the image on the photographic medium; and additionally recording for each pixel of the array of pixels a subset of the n bits describing the color of the pixel on the photographic medium, the subset of the n bits comprising less than n bits.

2. The method according to claim 1, wherein the subset of the n bits includes bits describing pixels that are most affected by a degradation of the photographic medium or by insufficiencies of a process for retrieving the image from the photographic medium.

3. The method according to claim 1, wherein the subset of the n bits includes the least significant bits.

4. The method according to claim 1, further comprising generating the image by digitizing an analog image.

5. The method according to claim 1, wherein the subset of the n bits is recorded as a checkered pattern of binary values or grey values.

6. The method according to claim 5, wherein the checkered pattern comprises error correction data.

7. The method according to claim 5, wherein the checkered pattern is divided into sets of adjacent pixels of two or more blocks associated to the image.

8. The method according to claim 7, wherein the two or more blocks associated to the image are provided with position information of the sets of adjacent pixels.

9. The method according to claim 1, wherein the image and the subset of the n bits are recorded in neighboring areas of the photographic medium, on separate areas of the photographic medium, or on separate photographic media.

10. The method according to claim 1, wherein recording of the image and the subset of the n bits is performed by printing.

11. The method according to claim 1, wherein the photographic medium is a film, a microfilm, or a microfiche.

12. An apparatus that archives an image on a photographic medium, the image consisting of an array of pixels, where a color depth of the pixels is n bits, n being an integer, the apparatus comprising:
  a processor that determines for each pixel of the array of pixels, a subset of the n bits describing a color depth of the pixel, the subset of the n bits comprising less than n bits; and
  a recorder that records the array of pixels of the image, and additionally for each pixel of the array of pixels, the determined subset of the n bits on the photographic medium.

13. The apparatus of claim 12, wherein the subset of the n bits includes bits describing pixels that are most affected by a degradation of the photographic medium.

14. The apparatus of claim 12, wherein the subsets of the n bits includes bits estimating an original brightness of the pixels that are most affected by the degradation.

15. The apparatus of claim 12, wherein the subset of the n bits includes bits describing pixels that are most affected by insufficiencies of retrieving the image from the photographic medium.

16. The apparatus of claim 12, wherein the subset of the n bits is recorded as a checkered pattern.

17. The apparatus of claim 16, wherein the checkered pattern comprises grey values.

18. The apparatus of claim 16, wherein the checkered pattern comprises error correction data.

19. The apparatus of claim 16, wherein the checkered pattern is divided into sets of adjacent pixels of two or more blocks associated to the image.

20. The apparatus of claim 19, wherein the two or more blocks associated to the image are provided with position information of the sets of adjacent pixels.

* * * * *